United States Patent
Mayer et al.

(10) Patent No.: US 10,538,104 B2
(45) Date of Patent: Jan. 21, 2020

(54) MULTILEVEL DENSITY COMPENSATION FOR DIGITAL PRINTING MACHINES

(71) Applicant: HEIDELBERGER DRUCKMASCHINEN AG, Heidelberg (DE)

(72) Inventors: Martin Mayer, Ladenburg (DE); Ilias Trachanas, Plankstadt (DE); Andreas Schoemann, Heidelberg (DE); Gerd Junghans, Schwetzingen (DE); Thomas Schrank, Oyten (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 155 days.

(21) Appl. No.: 15/897,391

(22) Filed: Feb. 15, 2018

(65) Prior Publication Data

US 2018/0257390 A1 Sep. 13, 2018

(30) Foreign Application Priority Data

Mar. 8, 2017 (DE) .......................... 10 2017 203 791

(51) Int. Cl.
*B41J 2/015* (2006.01)
*B41J 2/21* (2006.01)

(52) U.S. Cl.
CPC ............. *B41J 2/2132* (2013.01); *B41J 2/211* (2013.01); *B41J 2/2121* (2013.01)

(58) Field of Classification Search
CPC ........ B41J 2/2132; B41J 2/211; B41J 2/2121; B41J 29/38; G01J 3/46; H04N 1/4057; H04N 1/502
See application file for complete search history.

(56) References Cited

U.S. PATENT DOCUMENTS

| 6,428,134 B1 | 8/2002 | Clark et al. |
| 2006/0262151 A1 | 11/2006 | Chiwata |

FOREIGN PATENT DOCUMENTS

| DE | 102013107942 A1 | 1/2015 |
| DE | 102014205163 A1 | 9/2015 |

OTHER PUBLICATIONS

Google translation of DE 10 2013107942, published on Jan. 2015 (Year: 2015).*
Google translation of DE 10 2014 205163, published on Sep. 2015 (Year: 2015).*

* cited by examiner

*Primary Examiner* — Huan H Tran
(74) *Attorney, Agent, or Firm* — Laurence A. Greenberg; Werner H. Stemer; Ralph E. Locher

(57) ABSTRACT

A method corrects color density unevenness during a printing operation on an inkjet printing machine having printing nozzles and a computer. The computer modifies the number or size of the drops to be applied to a printing substrate to attain nominal color density values after the processing of a rasterized print image. For different actual tone values, it is determined which target tone value is required to attain a nominal coloration by measuring a test image for every printing nozzle using a color measurement device, and, based thereon, an area coverage-dependent compensation profile is determined and saved on the computer to be applied in the printing operation to calculate the number and size of the drops on the computer.

9 Claims, 4 Drawing Sheets

MULTILEVEL DENSITY COMPENSATION FOR DIGITAL PRINTING MACHINES

CROSS-REFERENCE TO RELATED APPLICATION

This application claims the benefit, under 35 U.S.C. § 119, of German patent application DE 10 2017 203 791.1, filed Mar. 8, 2017; the prior application is herewith incorporated by reference in its entirety.

BACKGROUND OF THE INVENTION

Field of the Invention

The present invention relates to a method for correcting color density unevenness during a printing process in an inkjet printing machine having printing nozzles and a computer wherein after the processing of a rasterized print image, the computer modifies the number or size of the drops to be applied to the printing substrate to attain nominal color density values.

Generic methods of this kind for correcting color density unevenness deal with being able to make color density corrections even after the print image has been rasterized without having to rerasterize the print image. This is an important aspect because re-rasterizing the print image takes up a lot of computational effort and is very time-consuming. Especially for minor color density corrections, the time-consuming process of re-rasterizing the print image is uneconomical because it involves a considerable delay to the printing operation. This is especially uneconomical for small print runs, which frequently occur with digital printing machines such as inkjet printing machines. For this reason, a re-rasterizing of the print image is avoided and color density unevenness is corrected by modifying the number or size of the drops to be applied to the printing material. This is done by corresponding correction algorithms in the control board of the inkjet print heads. This means that the color density correction process is implemented after the rasterizing process.

Other prior art methods for correcting the rasterized print image require a re-rasterizing process. In this process, correction values are superimposed to the raster values of the print image and the image is rerasterized accordingly. This process is very time-consuming. It is known, for instance, from U.S. patent publication No. 2006/0262151 A1. Although the results of the method including the re-rasterizing process are very good in terms of quality, they suffer from the disadvantage that the print image needs to be rerasterized, a process that takes a lot of time.

The aforementioned method including a retroactive correction of the number and size of the drops without re-rasterizing the print image currently suffers from the disadvantage that the compensation may only be optimized for a tone value range. In most cases, image areas in the print image with deviating tone values are not sufficiently compensated. This insufficient compensation has a considerable effect on the print image in the regions of overlap between adjacent printing nozzles, regions that are known as stitching regions, because these regions in general require particularly strong compensation due to the metering characteristics of the print heads.

An object of the present invention is to provide a method for correcting color density unevenness during the printing operation in an inkjet printing machine including printing nozzles and a computer, the method avoiding a re-rasterizing of the printed image when color density values are corrected and capable of compensating for color density unevenness even in image areas that have deviating tone values.

In accordance with the invention, the above object is attained by the main patent claim. Advantageous embodiments of the present invention will become apparent from the dependent claims, the description, and the figures.

In accordance with the invention, it is envisaged that for different actual tone values, it is determined which target tone value is required to attain a nominal coloration by measuring a test image for every printing nozzle using a color measurement device. This means that the test image includes different tone values whose nominal color value is desired. Based on the actual color values measured by the color measurement device, a suitable target tone value required for the desired nominal coloration is determined. The target tone value/nominal coloration pairing that has been determined may then be used to determine an area coverage-dependent compensation profile. This compensation profile may then be saved on the computer of the inkjet printing machine. This area coverage-dependent compensation profile is then applied to the rasterized print image in every printing operation in order for the computer to calculate the corresponding number and/or size of the drops to be metered out by the inkjet heads. This allows the color density to be corrected in a quick and easy way, providing significant color density improvements even in different tone value areas.

In accordance with a preferred embodiment of the present invention it is envisaged that the computer applies the area coverage-dependent compensation profile by calculating the required number and/or size of the drops in real time during the printing operation. Due to the real time calculation, the correction of color density unevenness in accordance with the invention does not cause any time delay, allowing the correcting process to be implemented in every printing operation without any additional loss of time. The real time calculation of the required number and size of drops is carried out in the electronic actuating system, in particular on the control board, of the inkjet heads. This avoids any time-consuming re-rasterizing of the print image in the raster image processor (RIP) of the prepress department.

In accordance with a further embodiment of the invention it is envisaged that there are two drop sizes and the computer calculates the required number of the drops in both sizes. The drop sizes are preferably S and M. In addition, there is a drop size 0, i.e. a zero drop, which means that no drop is applied. In this way, only two drop sizes are required for efficient color density unevenness correction even for different tone value areas. It goes without saying that the present invention works with more sizes, too, in particular with an additional size L, but such a process takes up more computational effort and means only little improvement to color density unevenness correction.

In accordance with the present invention it is further envisaged that the computer carries out multiple steps to calculate the compensation profile. These steps in particular include calculating an intensity profile, eliminating white lines, adapting the intensity profile, allocating image dots to printing nozzles, as well as calculating nominal values. This is a way not only to correct color density unevenness in the correction process but also to prevent other image defects by masking white lines. For this purpose, the density profile is smoothed out computationally.

It is advantageously envisaged that from an original, the number and/or size of the drops is calculated in the form of an area coverage wedge as a function of the area coverage and the result is saved in the form of a drop mixture table. This drop mixture table is then used in the printing operation to correct ink density unevenness.

It is further envisaged that the computer calculates an actual area coverage and a nominal area coverage for every nozzle. The nominal area coverage results from an analysis of the density profile of the printed test image whereas the actual area coverage for every nozzle is derived from the measured values on the test image by the computer. The crucial aspect is that in the end, the computer knows the actual area coverage and the corresponding nominal area coverage for every nozzle so that corresponding correction values are available for every nozzle and may be taken into consideration when the drop mixture table is created.

It is further envisaged that based on the nominal area coverage and the actual area coverage, the computer calculates a compensation factor. The drop mixture table is required to determine how many size S and size M drops, for instance, are necessary for a specific area coverage.

Other features which are considered as characteristic for the invention are set forth in the appended claims.

Although the invention is illustrated and described herein as embodied in a multilevel density compensation for digital printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
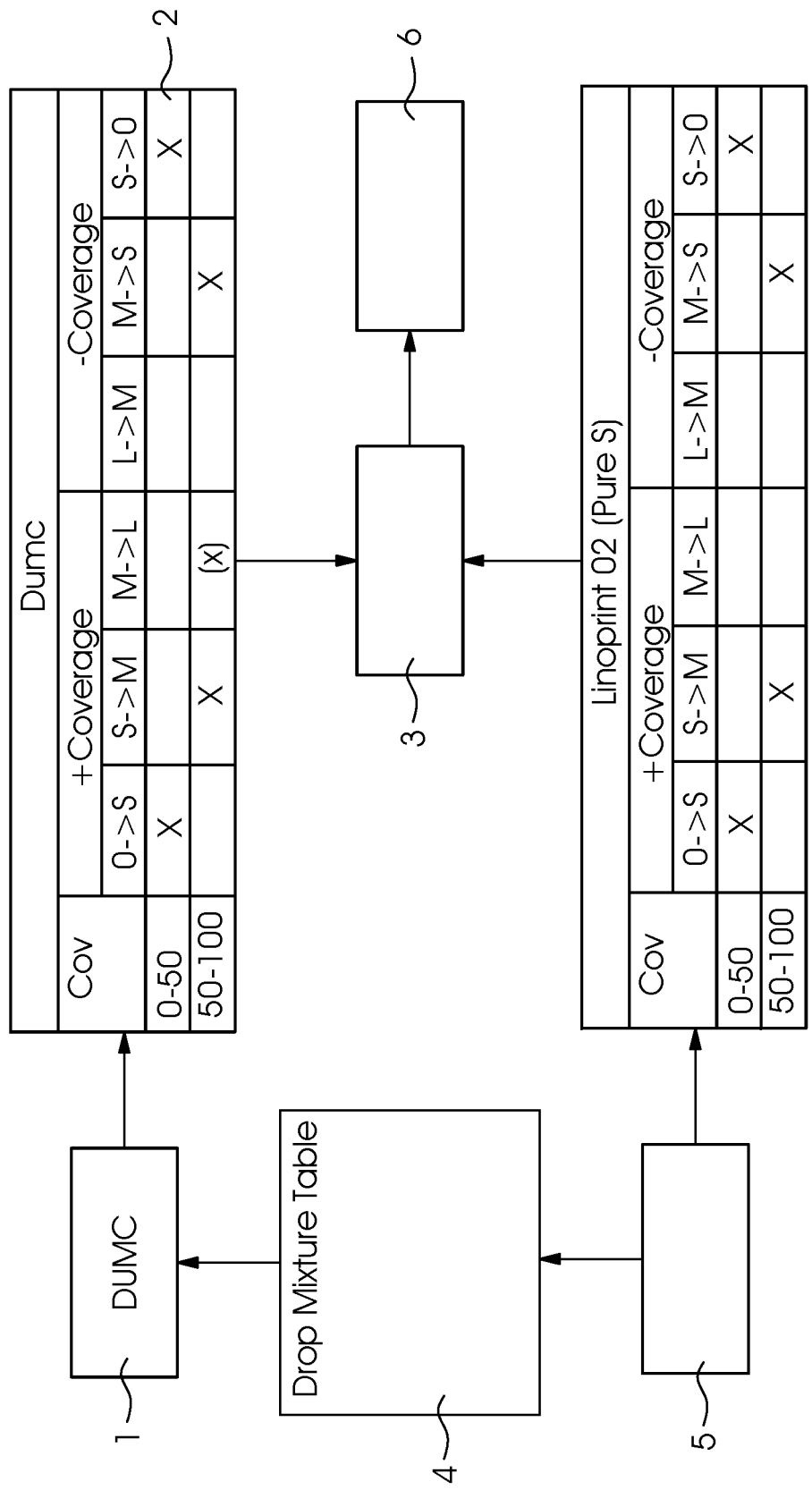
FIG. 1 is an illustration showing a method of the invention for correcting color density using a drop mixture table.

Referring now to the figures of the drawings in detail and first, particularly to FIG. 1 thereof, there is shown the influence of the new multi-level density compensation method on a rasterized print image when drops are generated to control an inkjet printing machine. Like in the prior art, the first step is to rasterize the print image to create a number of color separations in a rasterizing process 5. The rasterizing process 5 results in a gray scale color separation for every color. These gray scale pixels then need to be converted into corresponding actuating values for actuating the printing nozzles of the inkjet printing machine. The process shown in FIG. 1 relies on two different drop sizes, namely drop sizes S and M. The conversion table of the rasterization software using the Linoprint 02 (Pure S) raster type further indicates that in case of an area coverage increase in the range of between 0 and 50% area coverage, non-existing image dots are turned into small drops S whereas in the case of an area coverage increase in the range of between 50 and 100%, size S drops are turned into size M drops. For an area coverage decrease, M size drops are converted into S size drops in the case of an area coverage of between 50 and 100% and S size drops are converted into empty spaces in the case of an area coverage of between 0 and 50%. In this way, the operator may intentionally increase or decrease the area coverage in the inkjet printing machine or in the prepress process.

A hybrid rasterizing process is likewise possible; for instance, size zero drops may occur up to 70% area coverage and size M drops may occur from 30% area coverage up.

Figure 2:
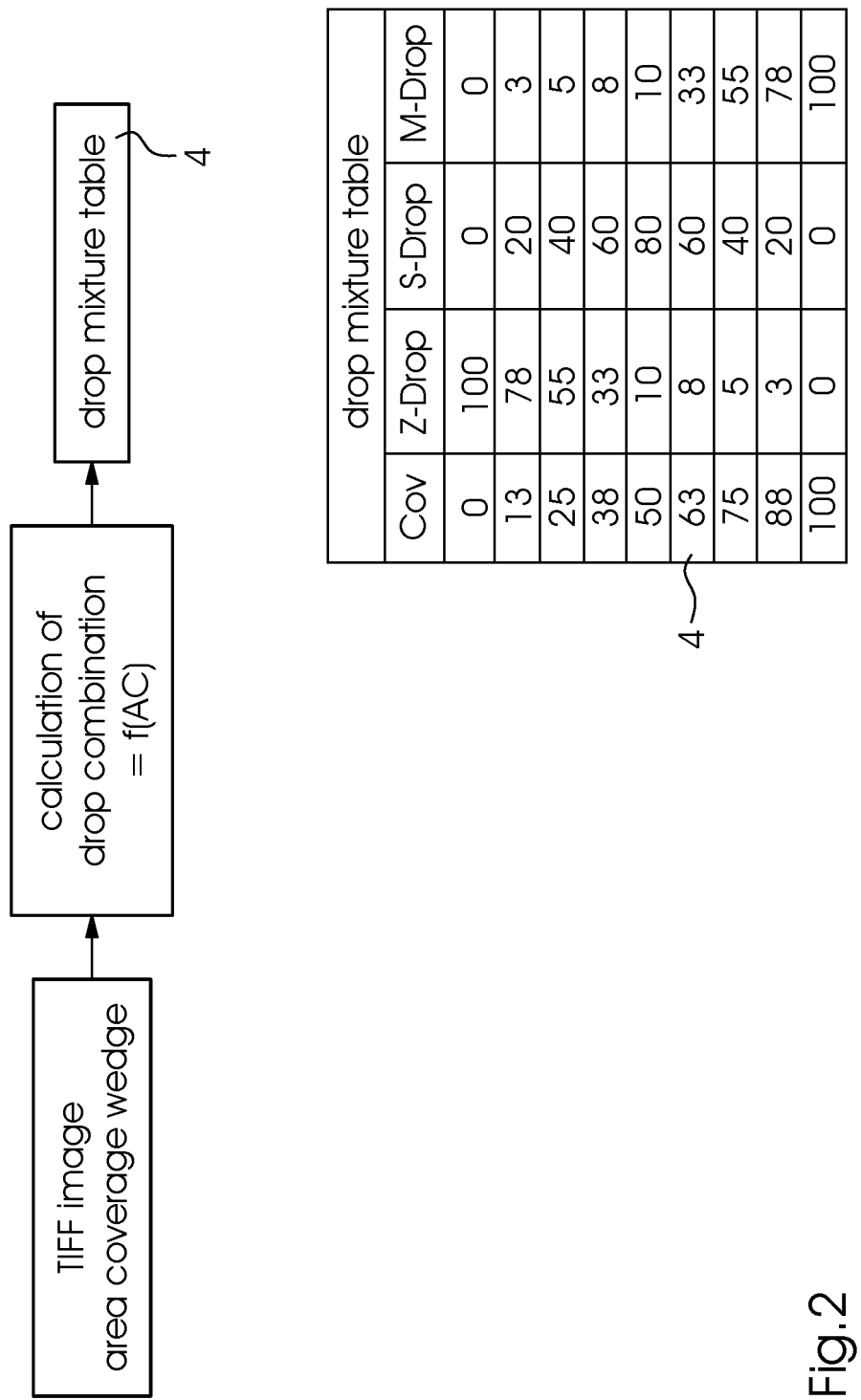
FIG. 2 is an illustration of a structure of the drop mixture table.

The left-hand margin shows how the distribution of drops and sizes may be more finely graded in different tone value areas using a drop mixture table 4. This drop mixture table 4, an enlarged representation of which is shown in FIG. 2, contains no drops at all at an area coverage of 0%. At an area coverage of 13%, 20 size S drops and 3 size M drops are used. At an area coverage of 25%, 40 size S drops and 5 size M drops are used. At an area coverage of 38%, 60 size S drops and 8 size M drops are used. This increases up to an area coverage of 100%, where 100% size M drops are used, see FIG. 2. This drop mixture table 4 is used in the density deviation detection and compensation method 1 of the invention. An area coverage increase by drop size correction 2 is achieved in the same way as in previous methods. Once the drop mixture table 4 has been applied in the density deviation detection and compensation method 1 and an intentional modification has been made by a drop size correction 2 for an intentional increase or decrease of the area coverage values, the result is a nozzle image 3 suitable for actuating the printing nozzles. Actuating the printing nozzles by the drop actuation signals corresponding to the nozzle image 3 will then cause the actuated inkjet print heads in the inkjet printing machine to print the print image in the desired printed color density 6.

The core element of the present invention is the drop mixture table 4, which is shown in an enlarged representation in FIG. 2. For specific area coverage values, this drop mixture table 4 contains a respective corresponding associated number of drops in sizes S and M as well as 0 for nonexistent drops also referred to as Z drops. The drop mixture table 4 is derived from a digital prepress print image, preferably in a TIFF format. This digital print image represents a test image including an area coverage wedge, i.e. the area coverage values are present in specific increments, which preferably correspond to the increments of the area coverage of the drop mixture table 4, and are printed in the inkjet printing machine. Based on the area coverage wedge, a drop combination may be calculated as a function of the area coverage. The drop combination is then saved on the computer of the inkjet printing machine in the form of the drop mixture table 4.

Figure 3:
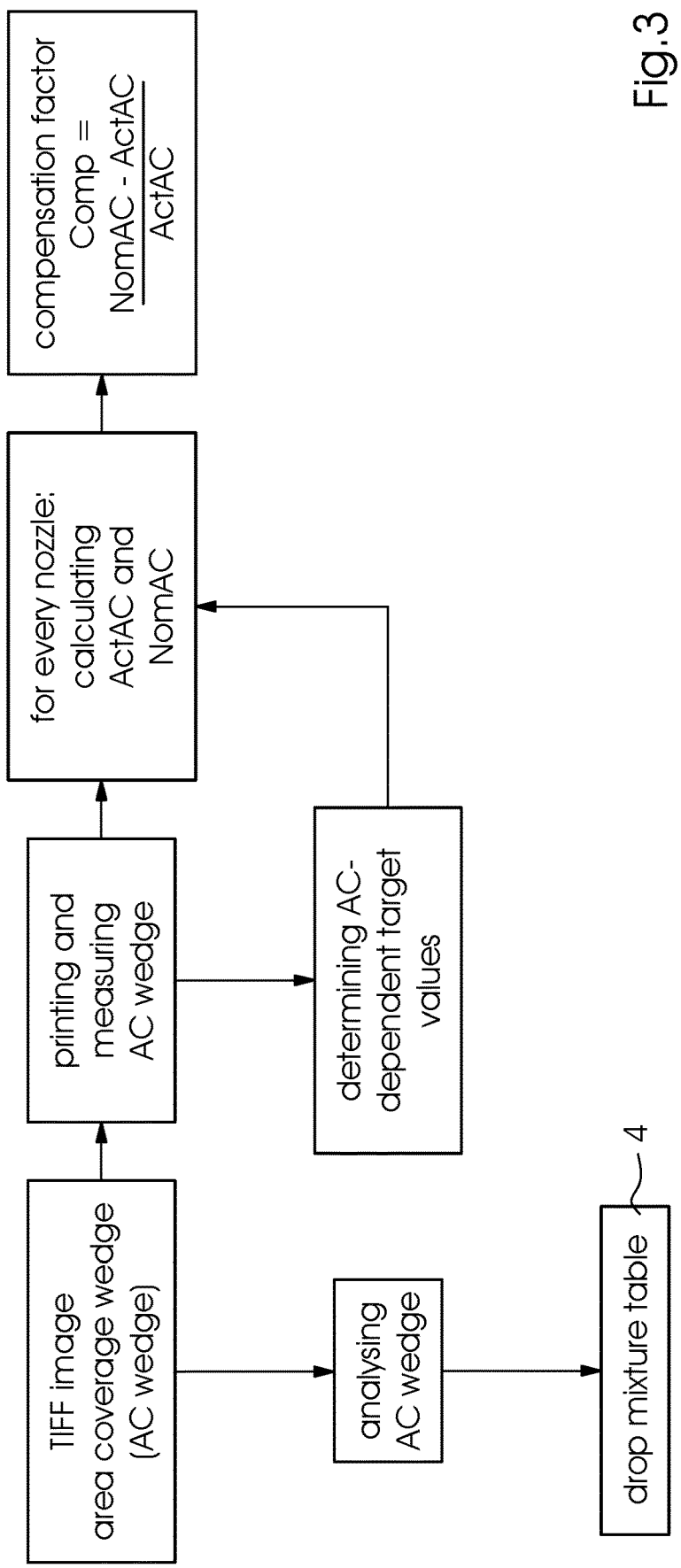
FIG. 3 is an illustration showing a creation of the drop mixture table and of a compensation factor from an analysis of an area coverage wedge.

How to proceed to compensate for and establish the density deviation is explained in FIG. 3. Here, it is likewise shown that the first step is to print the digital test image in the form of a print image in the TIFF format and including an area coverage wedge on the digital printing machine and to measure the print. The measurement is taken on the printing substrates inside or outside the printing machine by means of a color measurement device. The actual area coverage is available and the target area coverage for achieving the nominal tone value is saved. In addition, the computer establishes what are referred to as area coverage-dependent target tone values, which for instance result from the average intensity or density of all nozzles of one color at a defined actual area coverage. For every nozzle, the computer calculates the corresponding actual area coverage ActAC as a function of the measured actual tone values and the corresponding nominal area coverage NomAC based on the area coverage-dependent target tone values. Based on these two values, the computer then calculates a compensation factor Comp by subtracting the actual area coverage from the nominal area coverage and dividing the result by the actual area coverage. This compensation factor Comp is saved as a numerical value for every nozzle. Simultaneously, the computer analyzes the digital print image of the area coverage wedge to derive a corresponding drop mixture table 4. The drop mixture table 4 needs to be established only once for every rasterizing process because it remains unchanged if the rasterization parameters are not changed.

Figure 4:
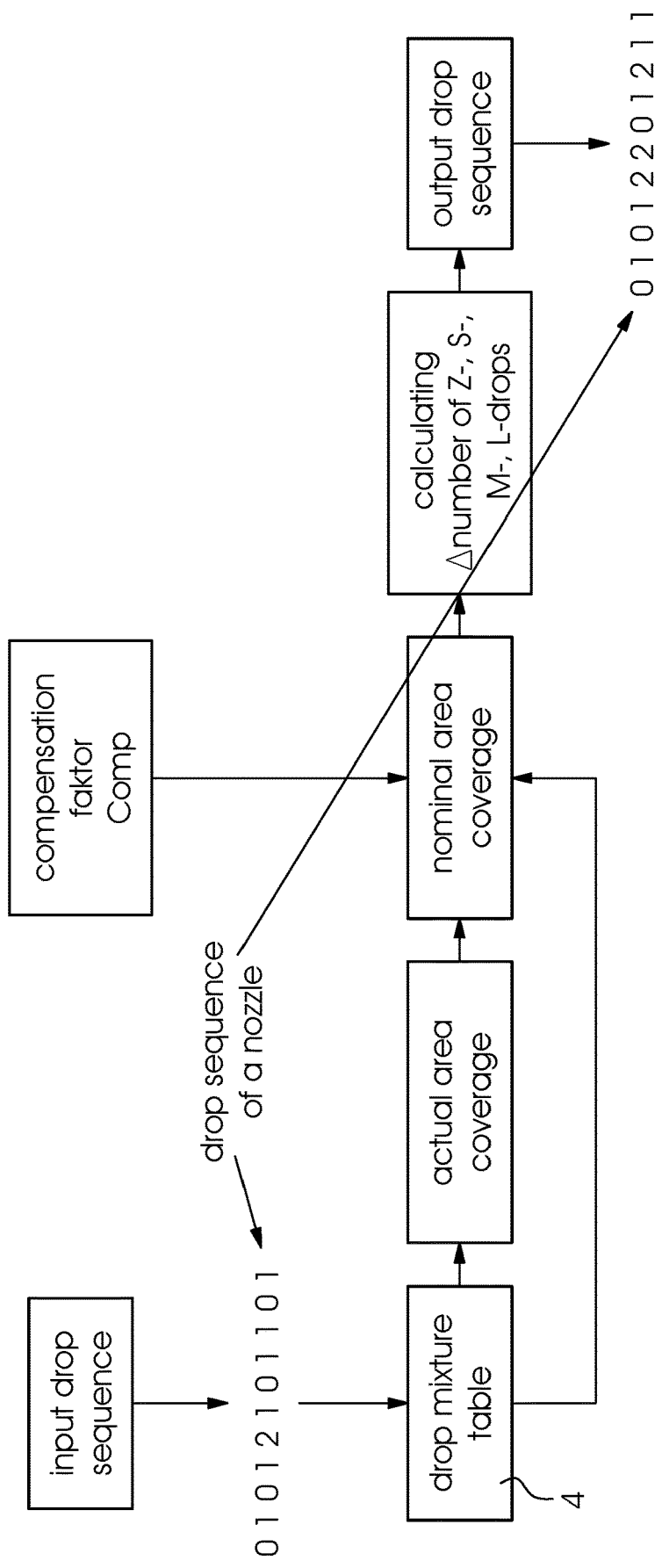
FIG. 4 is an illustration showing an application of the drop mixture table and compensation factor for correcting the color density in a printing operation.

The implementation of the density deviation detection and compensation process 1 is described in more detail in FIG. 4. It can be seen that a specific actuation frequency with drop sizes 0, 1, 2, which correspond to drop sizes 0, S, M, occurs as a function of the print image. The compensation factor Comp is calculated based on the actual area coverage and the area coverage-dependent characteristic compensation curve valid for the current image column, and the target area coverage is calculated based on the compensation factor Comp. As a result, the input drop succession sequence changes to become the output sequence for actuating the printing nozzle. FIG. 4 shows that the sixth drop of the sequence, which was originally a size S drop, has now become a size M drop. The same applies to the ninth drop. In addition, the tenth drop is changed from a zero drop to a size S drop.

An advantage of the method of the invention is that it factors in the precise structure of the raster in the different area coverages by means of the drop mixture table 4. In principle, it attains the same number of 0, S and M drops as the rasterization for actuating the inkjet print heads, but it potentially positions the drops at different locations than the rasterizing process.

As an alternative to the process shown in FIG. 4, it is possible to use a multiplication approach instead of the addition-based correction shown therein. To avoid artefacts at image borders, an additive correction requires an edge filter for resetting the defect counters. This defect counter requires additional memory space on the computer, which may result in resource problems if it is implemented on the actuation boards of the printing nozzles structured in the form of FPGA. A multiplication-based approach avoids this as it does not require edge filters and thus has advantages in terms of implementation.

The following is a summary list of reference numerals and the corresponding structure used in the above description of the invention:
1 density deviation detection and compensation method
2 drop size correction
3 nozzle image
4 drop mixture table
5 rasterizing process
6 printed density
0 no drop
S small drop
M medium drop
L large drop
AC area coverage
Comp compensation factor

The invention claimed is:

1. A method for correcting color density unevenness during a printing operation on an inkjet printing machine having printing nozzles and a computer, which comprises the steps of:
modifying, via the computer, a number or size of drops to be applied to a printing substrate after a processing of a rasterized print image to attain nominal color density values;
determining, for different actual tone values, which target tone value is required to attain a nominal coloration by measuring a test image for every printing nozzle using a color measurement device; and
determining an area coverage-dependent compensation profile based on the target tone value and saving the area coverage-dependent compensation profile on the computer to be applied during the printing operation to calculate the number and/or the size of the drops on the computer.

2. The method according to claim 1, wherein the computer applies the area coverage-dependent compensation profile by calculating a required number and/or the size of the drops in real time during the printing operation.

3. The method according to claim 1, wherein the drops exist in two sizes and the computer calculates a required number of the drops in the two sizes.

4. The method according to claim 3, wherein the drops exist in the two drop sizes S and M.

5. The method according to claim 1, which further comprising carrying out, via the computer, a number of steps to calculate the area coverage-dependent compensation profile.

6. The method according to claim 5, which further comprises performing the following steps of:
calculating an intensity profile;
masking white lines;
adapting the intensity profile;
allocating image dots to the printing nozzles; and
calculating nominal values.

7. The method according to claim 1, which further comprises:
calculating an area coverage wedge from a print original in digital form; and
calculating, via the computer, the number and/or the size of the drops in dependence on area coverage and saving a result in a form of a drop mixture table.

8. The method according to claim 1, which further comprises calculating, via the computer, an actual area coverage and a nominal area coverage for every nozzle.

9. The method according to claim 8, which further comprises calculating, via the computer, a compensation factor based on the nominal area coverage and the actual area coverage.

* * * * *